United States Patent [19]

Forni

[11] Patent Number: 4,472,075
[45] Date of Patent: Sep. 18, 1984

[54] PIVOTABLE CONNECTING DEVICE

[75] Inventor: Daniel Forni, Sevran, France

[73] Assignee: Tourolle et Fils, Claye Souilly, France

[21] Appl. No.: 395,671

[22] Filed: Jul. 6, 1982

[30] Foreign Application Priority Data

Jul. 16, 1981 [FR] France .................. 81 13899

[51] Int. Cl.$^3$ .............................................. F16C 11/06
[52] U.S. Cl. .................... 403/157; 464/112; 403/408
[58] Field of Search ............. 403/157, 158, 161, 162, 403/188, 388, 408, 163, 156; 464/112, 134

[56] References Cited

U.S. PATENT DOCUMENTS 2,820,241 1/1958 Schlage .......................... 403/161 X
2,934,182 4/1960 Neville ................................ 403/408
4,243,341 1/1981 Kabay et al. .................. 403/158 X

FOREIGN PATENT DOCUMENTS 214216 3/1958 Australia ............................ 403/161
811585 4/1959 United Kingdom ............... 403/157

Primary Examiner—Andrew V. Kundrat
Attorney, Agent, or Firm—Walter H. Schneider

[57] ABSTRACT

A pivotable connecting device adapted to transmit rotary motion from a drive member to a driven member while minimizing the effect of torque thereon. The drive member is provided with a fork having first and second shanks each with a threaded hole. The driven member is provided with a coupling plate having a corresponding smooth hole. A screw member for insertion in the holes is provided having a smooth central portion and first and second threaded ends. The diameter of the first threaded shank hole is greater than that of the coupling plate smooth hole, and the diameter of the latter is at least as great as the diameter of the second threaded shank hole. The pitch and helix of the first and second threaded shank holes are identical thereby permitting simultaneous tightening of the first and second threaded screw ends into the corresponding first and second threaded shank holes.

3 Claims, 2 Drawing Figures

PIVOTABLE CONNECTING DEVICE

BACKGROUND OF THE INVENTION

1. Field of the Invention

The present invention relates to a pivotable device connecting two rods. More particularly, the present invention relates to a pivotable connecting device through which a torque is transmitted from a drive rod to a driven rod.

2. Description of the Prior Art

In engineering techniques, it is often necessary to use pivotable fittings permitting the relative pivoting of two pieces. Often also, and this is the case with certain transmission joints, not only must the pieces pivot about their pivot pin, they are also required to transmit a torque.

When the pivotable connection is achieved by means of an eye placed between the two shanks of a fork, with a pin transversing the assembly, the effect of the torque is to push the two shanks apart until the device becomes completely unusable.

SUMMARY OF THE INVENTION

It is the object of the present invention to overcome this drawback of the known devices by proposing a pivot pin fitted between two pieces, and achieving a pivotable connection of said pieces, constituted by:

- a fork with at least two parallel shanks, provided on one of said two pieces,
- a pivot hinge integral with the second piece,
- three co-axial holes provided in the two shanks and in the said hinge, respectively, and,
- a pivoting axle which is concomitantly introduced into these three holes.

The said axle comprises:

two end parts
- of different diameter,
- which are equally threaded according to a common helix, and
- adapted to cooperate with tappings correspondingly provided in the holes made in the shanks of the fork of the first piece, and, a middle part,
- situated between the two end parts,
- constituting the pivotable part proper of the connection,
- cooperating with the hole provided in the second piece, and,
- of smaller diameter than the largest of the diameters of the two end parts.

The following dispositions are also preferably adopted:

- the middle part of the axle is equal in diameter, except for assembling play, to the diameter of the hole provided in the second piece,
- the diameter of the middle part of the axle is greater than the external diameter of the thread on the end of said axle having the smallest diameter;
- a shoulder member ensures the connection of the middle part with the end portion of the axle having the smallest diameter, and constitutes a supporting face locking the axle in position on that of the two shanks which comprises the hole cooperating with the threaded end of the axle having the smallest diameter.

DESCRIPTION OF THE DRAWING

The invention will be more readily understood on reading the following description with reference to the accompanying drawings in which.

DESCRIPTION OF THE PREFERRED EMBODIMENT

Figure 1:
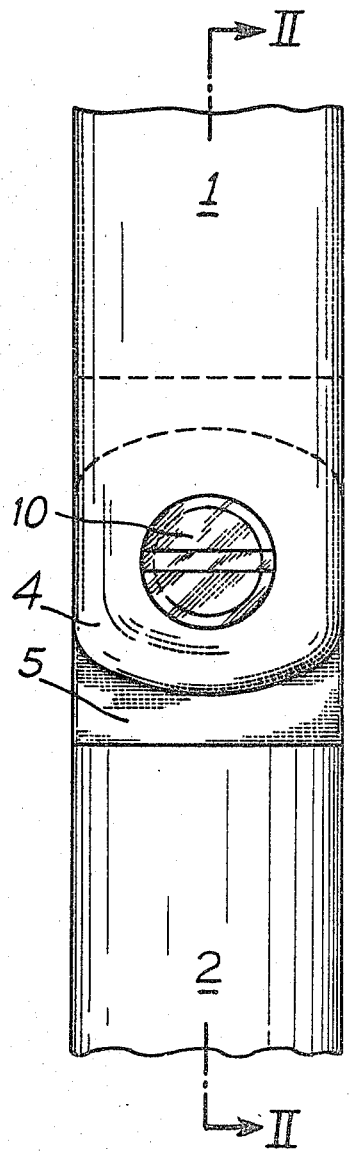
FIG. 1 is an elevational view of an assembly according to the invention.
Figure 2:
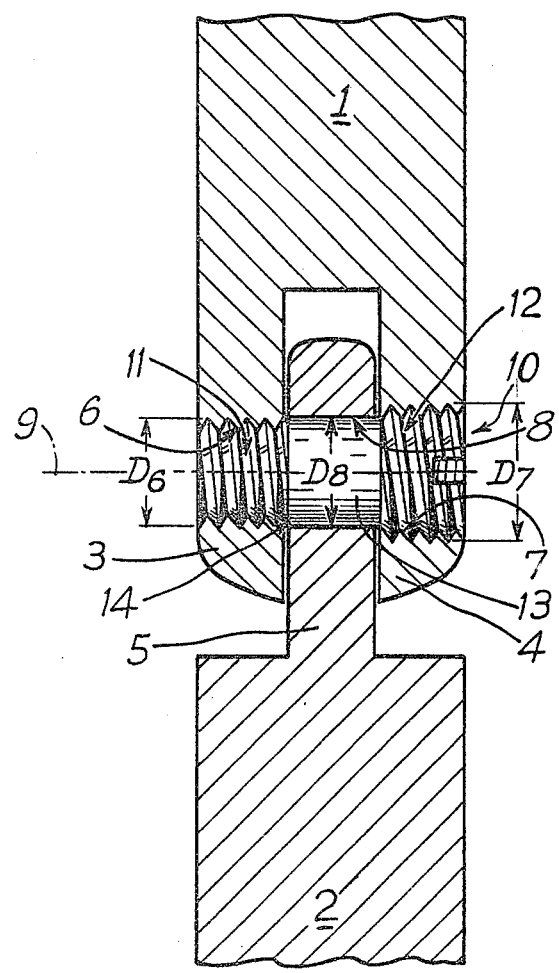
FIG. 2 is a cross-section along line II—II of FIG. 1.

The illustrated pivotable connecting device of FIGS. 1 and 2 comprises two connecting rods 1 and 2 mounted for sliding engagement in two bores integral with two rotatable and, in general, non-aligned shafts, i.e., a drive shaft and a driven shaft, not shown. Thus, in use, a driving torque is transmitted from connecting drive rod 1 through the pivotable connecting device of this invention to the connecting driven rod 2. As shown in FIG. 2, the pivotable connecting device comprises a fork integral with rod 1 comprising parallel shanks 3 and 4, and a coupling plate 5 integral with rod 2, said coupling plate 5 being adapted to be inserted with play between the shanks 3 and 4. Shanks 3 and 4 are further provided with tapped holes 6 and 7, respectively, of diameters $D_6$ and $D_7$ at the deepest parts of their threads, while coupling plate 5 is provided with a smooth cylindrical hole 8 of diameter $D_8$. The diameters of the three holes are such that $D_7$ is greater than $D_8$, while $D_8$ is at least equal to, but preferably greater than, $D_6$. As a representative specific embodiment of the device of the invention, therefore, the three diameters of $D_6$, $D_7$ and $D_8$ could be 8 mm, 10 mm and 9 mm, respectively.

Holes 6 and 7 of shanks 3 and 4, and hole 8 of coupling plate 5, have a common axis 9, and are adapted to receive a screw member 10 having threaded end portions 11 and 12, the threads of which correspond to tappings 6 and 7, respectively. Tappings 6 and 7 and threaded portions 11 and 12 of screw 10 have a constant pitch following a common helix. Screw 10 is further provided with a smooth cylindrical center part 13 the diameter of which is equal to that of hole 8 except for assemblying play. Screw 10 is also provided with a shoulder member 14 which connects the threaded end 11 to the smooth center part 13, said shoulder member 14 constituting a means for locking screw member 10 in position against the internal face of shank 3.

When the pivotable connecting device of this invention is assembled connecting rod 2 is adapted to pivot with respect to connecting rod 1 by virtue of its relationship with smooth cylindrical center part 13 of screw member 10. At the same time, shanks 3 and 4 of the fork of connecting rod 1 are caused to be maintained at a constant spacing by virtue of their threaded relationship with ends 11 and 12 of screw member 10. It is thus possible, therefore, to transmit a rotary motion through the pivotable connecting device without the applied torque causing shanks 3 and 4 of the fork of connecting rod 1 to spread outwardly so as to damage the connecting device. In application of the pivotable connecting device of this invention, for example, it has been found that when employed in a selected assembly, it was possible to transmit a torque of 400 Newtons per meter for over a period of 3000 hours before the device began to deteriorate. In contrast, when using a device as heretofore normally employed in such an assembly, it was possible to transmit a torque of only 200 Newtons per meter for a period of only 1000 hours before deterioration of the device set in.

The invention is in no way limited to the description given hereinabove and on the contrary covers any modifications that can be brought thereto without departing from the scope thereof.

I claim:

1. A device for transmitting a rotary motion from a drive rod through a pivoting connection to a driven rod which comprises: a drive rod provided at its end with a fork comprising separated first and second shank members; a driven rod provided at its end with a coupling plate adapted to be inserted between said fork shank members; a threaded shank hole in each of said shank members of common axis, said axis also being common with that of an unthreaded hole in said coupling plate when the latter is inserted between said shank members, said first shank member hole being of diameter greater than said coupling plate hole and said coupling plate hole being of diameter equal to or greater than said second shank member hole; and a screw member adapted to to be inserted into said first and second shank member holes and said coupling plate hole having first and second threaded ends corresponding in diameter to said first and second threaded shank member holes, respectively, and an unthreaded central portion essentially corresponding in diameter to the diameter of said unthreaded coupling plate hole, said threaded shank member holes and said threaded screw member ends being identical in pitch and helix whereby said second threaded end of said screw member can be inserted through said first threaded shank member hole and then through said unthreaded coupling plate hole into said second threaded shank member hole so that said first and second threaded screw member ends can be simultaneously turned tightly into said corresponding first and second shank member holes, thereby providing a connection between said drive rod and said driven rod pivotable about said unthreaded central portion of said screw member while said threaded ends thereof cooperate with said threaded shank member holes to resist the effect of the torque applied to said shank members by virtue of the rotary motion transmitted from said drive rod through said device to said driven rod.

2. A device according to claim 1 which the diameter of said coupling plate hole is greater than the diameter of said second shank member hole.

3. A device according to claim 2 in which said unthreaded central portion of said screw member is provided with a shoulder adjacent the inside face of its second threaded end which is adapted to abut the internal face of said second shank member when said first and second threaded screw member ends are tightened into said first and second threaded shank member holes, thereby effectively locking said screw member in position.

* * * * *